US005781121A

United States Patent [19]

Kawamura

[11] Patent Number: 5,781,121

[45] Date of Patent: Jul. 14, 1998

[54] SECURITY SYSTEM AND METHOD THEREFOR

[75] Inventor: Yukio Kawamura, Yokkaichi, Japan

[73] Assignee: Sumitomo Wiring Systems, Ltd., Japan

[21] Appl. No.: 621,113

[22] Filed: Mar. 22, 1996

[30] Foreign Application Priority Data

Mar. 24, 1995 [JP] Japan .................................... 7-066032

[51] Int. Cl.[6] ............................... G06F 7/04; H04B 1/02; G08C 19/00

[52] U.S. Cl. ................. 340/825.31; 455/92; 340/825.72; 340/69

[58] Field of Search ......................... 340/825.31, 825.69, 340/825.3, 825.72, 825.34, 825.06, 542; 455/92

[56] References Cited

U.S. PATENT DOCUMENTS

| | | | |
|---|---|---|---|
| 4,596,985 | 6/1986 | Bongard et al. . | |
| 5,103,221 | 4/1992 | Memmola | 340/825.31 |
| 5,159,329 | 10/1992 | Lindmayer et al. . | |
| 5,319,364 | 6/1994 | Waraksa | 340/825.72 |
| 5,594,429 | 1/1997 | Nakahara | 340/825.31 |

FOREIGN PATENT DOCUMENTS

| | | |
|---|---|---|
| 59-134285 | 8/1984 | Japan . |
| 62-201267 | 12/1987 | Japan . |
| 4-76175 | 3/1992 | Japan . |
| 4-81344 | 3/1992 | Japan . |
| 4-336185 | 11/1992 | Japan . |
| 6292262 | 10/1994 | Japan . |
| 7226979 | 8/1995 | Japan . |
| WO 95/01685 | 1/1995 | WIPO . |

OTHER PUBLICATIONS

Secure Remote Control System—by Jeffrey Wright and Mark Maiolani–p. 121, vol. 15, May 1992.

*Primary Examiner*—Brian Zimmerman
*Assistant Examiner*—Anthony A. Asongwed
*Attorney, Agent, or Firm*—Anthony J. Casella; Gerald E. Hespos; Ludomir A. Budzyn

[57] ABSTRACT

When an unlock switch 3 of a transmitter 1 is operated, a random number is generated. A transmitter-end CPU 6 conducts a calculation in accordance with a specified operational expression using the presently generated random number, and the calculation result is renewably stored in a transmitter-end storage 7. Then, an unlock data including an identification code, a calculation result code representative of the calculation result stored in the transmitter-end storage 7 before renewal, and a constant code representative of the presently generated random number is transmitted. On the other hand, in a receiver 11, a calculation is conducted in accordance with the same operational expressed as used in the transmitter 1 using the random number represented by the constant code of the presently received data, and the calculation result is renewably stored. If the identification code in the presently received data agrees with the identification code of a vehicle, the calculation result before renewal is compared with the calculation result represented by the calculation result code in the presently received data. If the calculation results agree, a door lock motor 18 is driven to unlock doors of the vehicle. The doors can be unlocked by a simple operation, and a vehicle theft can be prevented by a simple construction.

17 Claims, 6 Drawing Sheets

SECURITY SYSTEM AND METHOD THEREFOR

BACKGROUND OF THE INVENTION

A variety of systems for locking and unlocking doors of an automotive vehicle by means of a remote control using a signal are known. A first example of these systems is the one disclosed in Japanese Unexamined Patent Publication No. 59-134285. In this system, when the doors are to be unlocked, a group of countable code words are added to an unlock code by means of an encoder of a transmitter, and these codes are transmitted during a door unlocking operation. The codes are sequentially advanced such that an x-th code word is transmitted during an x-th operation. In the receiver, the code words are counted and sequentially advanced, and the x-th code words received during the x-th operation is converted into an unlock signal. In this system, in order to ensure synchronization of the encoder and the decoder, auxiliary code words different from the group of code words are generated as synchronization signals by a special operation of the transmitter. The auxiliary code words are countably arranged such that the auxiliary code words are counted and advanced by one when an x-th auxiliary code word is transmitted during the x-th operation. In the receiver, the received auxiliary code word is converted into an unlock signal and used to synchronize the operation of the decoder and that of the encoder.

However in the case that the auxiliary code words are sequentially advanced while being counted as in the above first example, if the number of auxiliary code words to be advanced is small, the auxiliary code words may be circulated soon and the vehicle may get stolen using the tapped code later. On the other hand, a large number of auxiliary code words necessitate a storage having a large capacity. Accordingly, when the transmitter is operated out of the range of a radio wave, the codes may not agree.

A second example is the system as disclosed in Japanese Unexamined Patent Publication No. 4-81344. In this system, removal of an ignition key is detected. Every time the ignition key is removed, a random number generator is driven, and a code changer changes a code to be transmitted from a transmitter on the basis of the generated random number.

However, the code may be tapped when the doors are locked after the ignition key is removed, and the doors may be unlocked using the tapped code.

A third example is the system as disclosed in Japanese Unexamined Patent Publication No. 4-76175. This system includes a portable transceiver for keyless entry and a vehicle-end transceiver. A specific signal comprising a specified key code transmitted from the portable transceiver is received by the vehicle-end transceiver, which in turn discriminates whether or not the received key code agrees with a key code stored therein. If the key codes agree, a code changer generates a random signal on the basis of a random number generated in a random number generator in the vehicle-end transceiver. The generated random signal is transmitted to the portable transceiver. At the same time, in the vehicle-end transceiver, the code changer conducts a calculation in accordance with a specified operational expression, and the calculation result is stored in a memory. The portable transceiver sends the received random signal to its code changer, conducts a specified calculation on the basis of the random signal, encodes and transmits the calculation result to the vehicle-end transceiver. Upon receipt of the encoded calculation result, the vehicle-end transceiver compares it with the calculation result stored in the memory thereof. If the calculation results agree, the vehicle-end transceiver unlocks the doors.

However, two transceivers capable of receiving and transmitting data are required. This makes the construction of the system complicated and leads to a poor portability.

A fourth example is the system as disclosed in Japanese Unexamined Patent Publication No. 4-336185. In this system, a transmitter transmits a data comprising a specific code, a variable code corresponding to the number of times an operation unit is operated, and a transmission information to a receiver. The receiver decodes the received data and determines based on the specific data and the variable data whether or not it is a correct data to receive. When the variable code disagrees with the number of actual data reception, a reception number code representative of the number of data reception is so renewed as to conform to the variable code in accordance with a specified operation in the transmitter. Thus, in the case that an owner of a vehicle lost the transmitter or had it stolen, the receiver may not be in a data receiving state even if the other operates the lost or stolen transmitter.

However, if the reception number code is so renewed as to conform to the variable code in accordance with the specified operation in the transmitter as in the above fourth example, then it is very cumbersome because the transmitter has to specially perform the specified operation every time the code needs to be renewed.

A fifth example is the system as shown in Japanese Unexamined Utility Model Publication No. 62-201267. In this system, if a receiver receives codes different from a registered code two times or more in succession, it is brought into an input prohibition state for 5 seconds. If the receiver receives a different code within 1 second after being released from the input prohibited state, a warning is given.

However, a warning may be given upon incidental receipt of a code transmitted to another vehicle. Further, the vehicle may get stolen by the use of a device for incrementally advancing pairs of codes at intervals of 6 seconds.

In view of the above problems, an object of the present invention is to provide an improved security system, in particular a keyless entry system, having a simple construction which is capable of outputting a command signal, in particular for unlocking doors, by a simple operation, and to provide a method therefor.

SUMMARY OF THE INVENTION

According to the invention there is provided a security system for an automotive vehicle, which comprises a transmitter means, being in particular portable, and a receiver means, wherein the transmitter means comprises: a number generator means for periodically generating numbers $a_i$, $a_{i+1}$, a transmitter-end calculation unit for, in particular periodically calculating at least one transmitter variable $d_i$, $d_{i+1}$ in accordance with or based on a predetermined operational expression using the respective number $a_i$, $a_{i+1}$ generated in the present step as a constant, and a transmitting unit for transmitting data to the receiver means, wherein the data comprises a transmitter variable code obtained by encoding the precedingly calculated transmitter variable $d_i$, and a constant code obtained by encoding the number $a_{i+1}$ generated in the present step, and wherein the receiver means comprises: a receiving unit for receiving the data received from or transmitted by the transmitter means, a receiver-end calculation unit for calculating at least one receiver variable $e_{i+1}$ in accordance with or corresponding to the predetermined operational expression of the transmitter-end calculation unit using the number $a_{i+1}$ represented by the constant code in the data received in the present step, a controller means for comparing the precedingly calculated receiver variable, in particular stored in a receiver-end storage means before renewal, with the transmitter variable $d_i$ represented by the transmitter variable code in the received data, and outputting a control or command signal. The means for generating numbers may be a random number generator.

According to a preferred embodiment of the invention, a transmitter-end storage means renewably stores the transmitter variable $d_{i+1}$ after its calculation by the transmitter-end calculation unit and/or wherein a receiver-end storage means renewably stores the receiver variable $e_{i+1}$ after its calculation by the receiver-end calculation unit .

Preferably, the transmitted data comprise a specific identification code individually allocated, in particular to each vehicle, wherein the receiver means preferably comprises a discrimination unit for discriminating whether or not the identification code in the received data agrees with the code individually allocated or allotted.

Further preferably, the transmitted data comprise a control code, in particular parity bits for controlling the correct transmission of the data.

Further preferably, the transmitter means further comprises a data transmission switch for causing the transmitting unit to transmit the data.

According to a further preferred embodiment, the transmitted data comprise lock information and/or unlock information and wherein the controller means outputs a lock command signal and/or an unlock command signal, respectively.

According to the invention there is further provided a method for a security system, in particular using an inventive security system, comprising the following steps:

generating a random number $a_{i+1}$;

encoding a precedingly generated or calculated, in particular stored, transmitter variable $d_i$ and the number $a_{i+1}$ in form of data;

transmitting the data;

calculating a new transmitter variable $d_{i+1}$ based on a predetermined operational expression using the number $a_{i+1}$ as a constant, receiving the data;

reading the transmitter variable $d_i$ and the number $a_{i+1}$ from the data; and calculating a new receiver variable $e_{i+1}$ based on a predetermined operational expression using the read number $a_{i+1}$ as a constant.

According to a preferred embodiment of the invention, the method further comprises the step of renewably storing the transmitter variable $d_{i+1}$ after the calculating step of the transmitter variable $d_{i+1}$ and/or the step of renewably storing the new receiver variable $e_{i+1}$ after the calculating step of the new receiver variable $e_{i+1}$.

According to a preferred embodiment of the invention, the method further comprises the step of comparing the read transmitter variable $d_i$ with a precedingly calculated or stored receiver variable $e_i$, in particular before the calculating step of a new receiver variable $e_{i+1}$.

Preferably, the method further comprises the step of issuing a command, when the read transmitter variable $d_i$ corresponds to the precedingly calculated or stored receiver variable $e_i$.

Further preferably, the encoding step further encodes an identification code in form of data, and further comprising an identification code reading step reading the identification code from the transmitted data and an identification code comparing step comparing the read identification code with a predetermined identification code, wherein the steps are preferably repeated to effect successive operations.

According to a preferred embodiment of the invention there is provided a keyless entry system which comprises a portable transmitter and a receiver provided in an automotive vehicle and in which, when the receiver receives an unlock data transmitted from the portable transmitter while doors of the vehicle are locked, a door locking means is driven to unlock the doors, wherein the portable transmitter comprises:

a transmission switch for transmitting the unlock data, a random number generator for generating a random number every time the transmission switch is operated, a transmitter-end calculation unit for calculating in accordance with an operational expression predetermined for each automotive vehicle using the random number generated when the transmission switch is operated as a constant, a transmitter-end storage for renewably storing the calculation result every time the transmitter-end calculation unit conducts a calculation, and a transmitting unit for transmitting an unlock data by operating the transmission switch, the unlock data comprising a specific identification code allocated to each vehicle, a calculation result code obtained by encoding the calculation result which was stored in the transmitter-end storage before renewal, and a constant code obtained by encoding the random number generated by the random number generator, and the receiver comprises:

a receiving unit for receiving the unlock data, a receiver-end calculation unit for calculating in accordance with the operational expression adopted by the transmitter-end calculation unit using the random number represented by the constant code in the unlock data received as a constant, a receiver-end storage for renewably storing the calculation result every time the receiver-end calculation unit conducts a calculation, a discrimination unit for discriminating whether or not the identification code in the unlock data received by the receiving unit agrees with the code allotted to the vehicle, a controller for, when the discrimination unit discriminates that the identification code agrees with the code allotted to the vehicle, comparing the calculation result stored in the receiver-end storage before renewal with the calculation result represented by the calculation result code in the unlock data, and outputting an unlock command signal when the two calculation results agree, and a driving unit for driving the door locking means upon receipt of the unlock command signal.

Accordingly, when the transmission switch is operated, the unlock data including the calculation result calculated using the previously generated random number and the presently generated random number is transmitted to the receiver. The receiver compares the calculation result obtained by conducting a calculation in accordance with the same operational expression as used in the transmitter using the previously generated random number with the calculation result in the received unlock data. If the calculation results agree, the doors are unlocked. On the other hand, in the transmitter, a calculation result to be transmitted next is calculated using the random number included in the previously transmitted unlock data and is stored. In the receiver, a calculation result to be compared next is obtained using the random number in the received data and is stored. Accordingly, it is not necessary to provide transceivers for both transmitting and receiving ends as in the prior art. Further, even if the transmitted data is tapped, the doors cannot be unlocked unless the specified operational expression is known, thereby effectively preventing the vehicle from getting stolen. Furthermore, even if the transmission switch is operated out of the range of a radio wave, the doors can be unlocked by the aforementioned operation if the transmission switch is operated at least twice within the range of the radio wave.

Thus, a vehicle theft can be prevented by a simple construction.

Further, even if the transmission switch is operated out of the range of a radio wave, the doors can be unlocked by operating the transmission switch at least twice within the range of the radio wave. Thus, the doors can be unlocked by a simple operation.

Preferably, the transmitter further comprises a lock data transmission switch for transmitting a lock data; the transmitting unit transmits the lock data comprising the specific identification code allotted to each vehicle and a lock information when the lock data transmission switch is operated; and when the receiver receives the lock data, the controller outputs a lock command signal and the driving unit drives the door locking means upon receipt of the lock command signal to lock the doors.

If, according to the above, the lock data different from the unlock data is transmitted when the lock data transmission switch provided in the portable transmitter is operated, and the doors are locked when the receiver receives the lock data, the doors can be both locked and unlocked by means of a remote control. This also effectively prevents the vehicle from getting stolen.

BRIEF DESCRIPTION OF THE DRAWINGS

These and other objects, features and advantages of the present invention will become more apparent upon a reading of the following detailed description and accompanying drawings in which.

DETAILED DESCRIPTION OF THE PREFERRED EMBODIMENT

Figure 1:
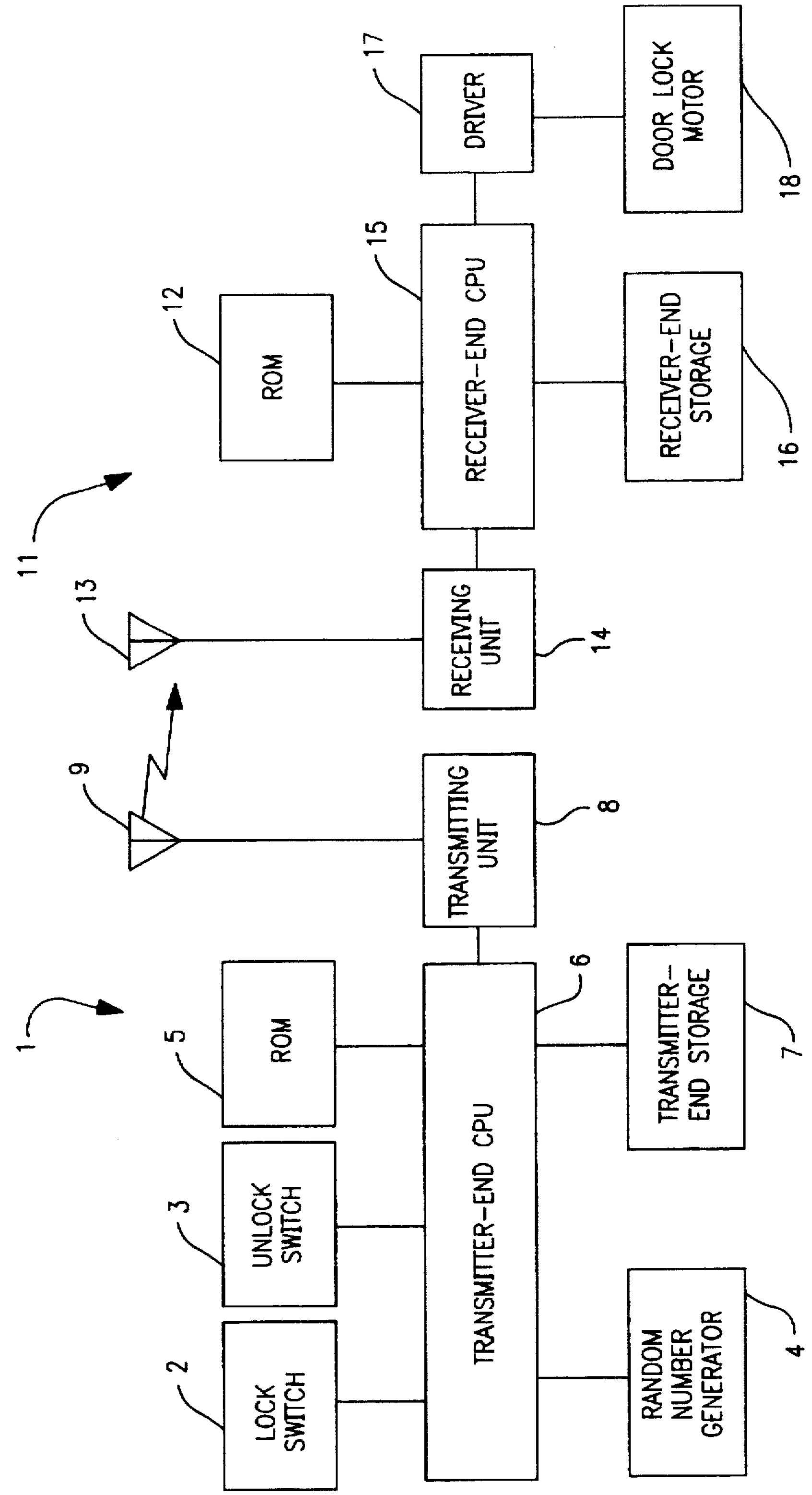
FIG. 1 is a block diagram of one embodiment according to the invention.

As shown in FIG. 1, a portable transmitter 1 is provided with a lock switch 2 as a transmission switch for transmitting lock data and an unlock switch 3 as a transmission switch for transmitting unlock data. A random number is generated by a random number generator 4 every time the unlock switch 3 is operated. An operation program including a predetermined or predeterminable operational expression or equation or formula (e.g. b+c×constant) is prestored in a ROM 5. A transmitter-end central processing unit (hereafter, "transmitter-end CPU") 6 which functions as an arithmetic unit of the transmitter conducts a calculation or computation in accordance with the operational expression of the program stored in the ROM 5, using the random number generated upon present operation of the unlock switch 3 as a constant. Every time the transmitter-end CPU 6 conducts a calculation, the calculation result is renewably or replaceably stored or memorized in a transmitter-end storage or memory 7 including e.g. an EEPROM.

Figure 2:
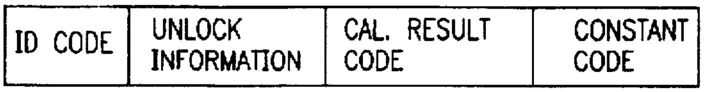
FIG. 2 is a diagram showing an unlock data.
Figure 3:
FIG. 3 is a diagram showing a lock data.

When the unlock switch 3 is operated, a transmitting unit 8 transmits unlock data, in particular as shown in FIG. 2 via a transmitting antenna 9 under the control of the transmitter-end CPU 6. The unlock data may include a specific identification (ID) code allotted to each single security system or group thereof, in particular to each automotive vehicle, an unlock information, a calculation result code obtained by encoding a calculation result stored in the transmitter-end storage 7 before renewal, and a constant code obtained by encoding the random number presently generated by the random number generator 4. Furthermore the unlock data may further include control data, comprising in particular parity bits, which allow for a control or verification of the data transmission. On the other hand, when the lock switch 2 is operated, the transmitting unit 8 transmits lock data, in particular as shown in FIG. 3 under the control of the transmitter-end CPU 6. The lock data includes the specified ID code and a lock information. The lock data may further include a control code comprising in particular one or more parity bits for controlling whether the transmission of the data has been performed correctly. The parity bits may be derived from the sum of each digit or each second digit of the data to be transferred or the like.

As shown in FIG. 1, in a receiver 11, an operation program including the same operational expression as stored in the ROM 5 of the transmitter 1 is prestored in a ROM 12. The operation program may alternatively include a modified operational expression as compared to the one stored in the ROM 5 of the transmitter, e.g. modified by adding or multiplying a predetermined or predeterminable constant. In this latter case the values of the results of the calculation will be modified accordingly before the comparison. When a receiving unit 14 receives the unlock data via a receiving antenna 13, a receiver-end central processing unit (hereafter, "receiver-end CPU") 15 which functions as an arithmetic unit of the receiver 11 conducts a calculation in accordance with the operational expression of the program stored in the ROM 12, using the random number represented by the constant code of the unlock data as a constant. Every time the receiver-end CPU 15 conducts a calculation, the calculation result is renewably stored in a receiver-end storage 16 including e.g. an EEPROM.

On the other hand, the receiver-end CPU 15 as a discriminator discriminates whether the ID code in the presently received unlock data agrees with the code allotted to the vehicle. When the discrimination result is in the affirmative, the receiver-end CPU 15 as a controller compares the calculation result which was stored in the receiver-end storage 16 before renewal with the calculation result represented by the calculation result code in the presently received unlock data. When both calculation results agree, the receiver-end CPU 15 outputs an unlock command signal to a driver 17, which in turn drives a door lock motor 18 as a door locking means to unlock doors of the vehicle.

When the receiving unit 14 receives the lock data from the transmitter 1, the receiver-end CPU 15 outputs a lock command signal to the driver 17, which in turn drives the door lock motor 18 to lock the doors.

Even if the unlock switch 3 is operated out of the range of a radio wave, the doors can be unlocked by the aforementioned operation by operating the unlock switch 3 at least twice within the range of the radio wave.

Next, a series of control operations according to a first embodiment are described with reference to FIGS. 4 and 5.

Figure 4:
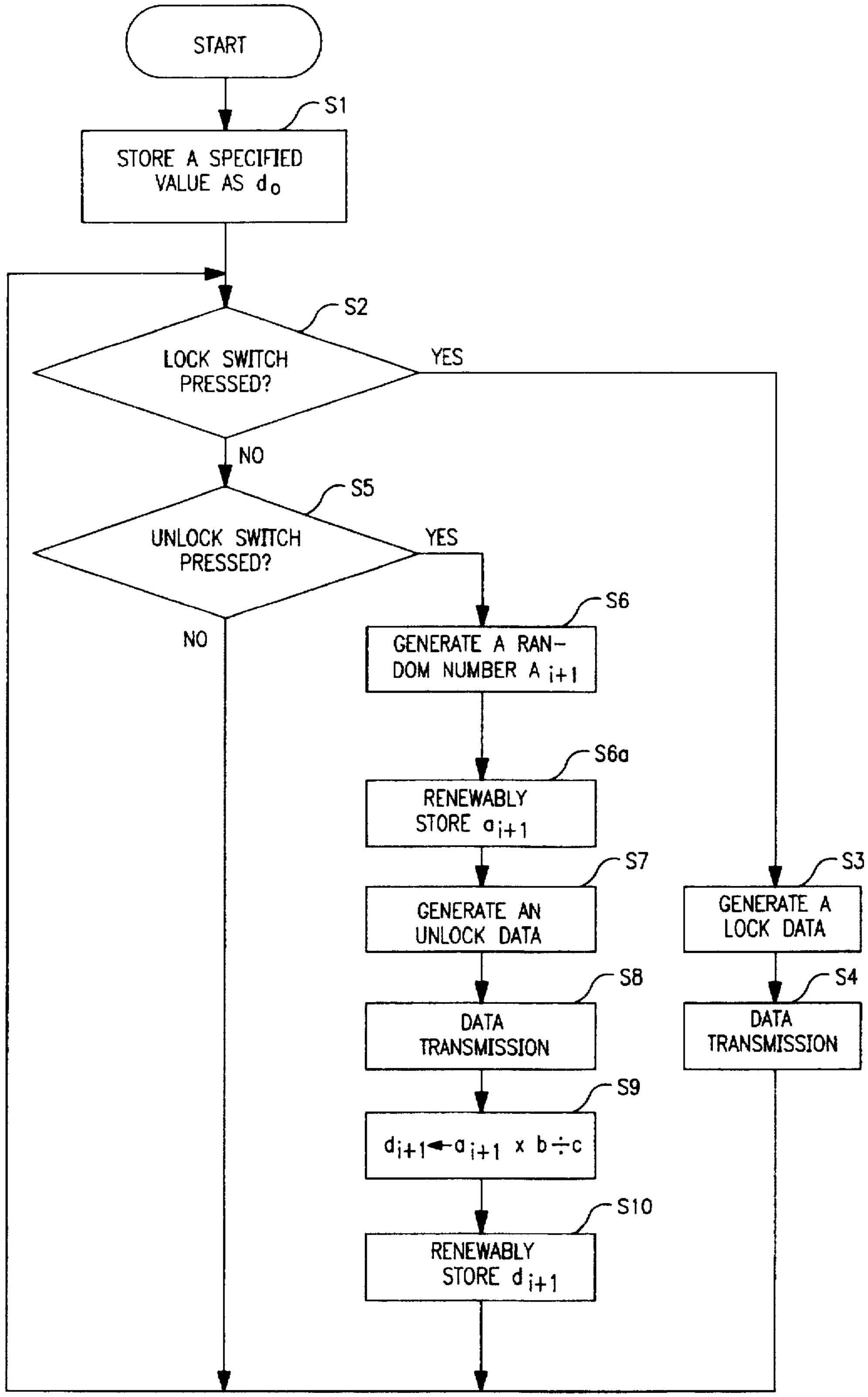
FIG. 4 is a flow chart showing the operation of a transmitter according to one embodiment.

The operations as shown in FIG. 4 are performed according to a preferred embodiment in the transmitter 1, for example, upon replacement of a battery or a resetting operation. Specifically, a specified value, e.g. a transmitter variable d, is stored as an initial data of a calculation result $d_0$ in the transmitter-end storage 7 (Step S1). Then, it is discriminated whether the lock switch 2 has been pressed (Step S2). If the discrimination result is in the affirmative, the lock data as shown in FIG. 3 is generated (Step S3) and transmitted (Step S4). Thereafter, this routine returns to Step S2.

If the discrimination result in Step S2 is in the negative, it is discriminated whether the unlock switch 3 has been pressed (Step S5). If the discrimination result is in the negative, this routine returns to Step S2. If the discrimination result is in the affirmative, the random number generator 4 generates a random number $a_{i+1}$ (Step S6); preferably the generated random number $a_{i+1}$ is renewably stored in a transmitter-side random number memory (STEP S6a); the unlock data as shown in FIG. 2 is generated (Step S7), wherein the unlock data comprises in particular the encoded transmitter variable $d_i$ calculated in the preceding step and the random number $a_{i+1}$ generated in this step, and transmitted (Step S8). Thereafter, the transmitter-end CPU 6 conducts a calculation in accordance with the predetermined or predeterminable operational expression (e.g. $a_{i+1}\times b+c$, wherein $a_{i+1}$ is the random number and b,c are constants) of the program stored in the ROM 5 using the random number $a_{i+1}$ generated in Step S6 as a constant (Step S9). The calculation result $d_{i+1}$ obtained by the transmitter-end CPU 6 is renewably stored in the transmitter-end storage 7 (Step S10).

The calculation result $d_i$ ($d_i=a_i\times b+c$ in the above example) in the unlock data generated in Step S7 is a value before being renewed in Step S10, i.e. the calculation result $d_i$ which was calculated or initialized in the preceding step or iteration.

Once the transmitter-side system has been initialized, in particular during the normal usage, the flow diagram shown in FIG. 4 is iterated or repeated skipping the STEP 1 of storing a specified value as the calculation result $d_0$.

Figure 5:
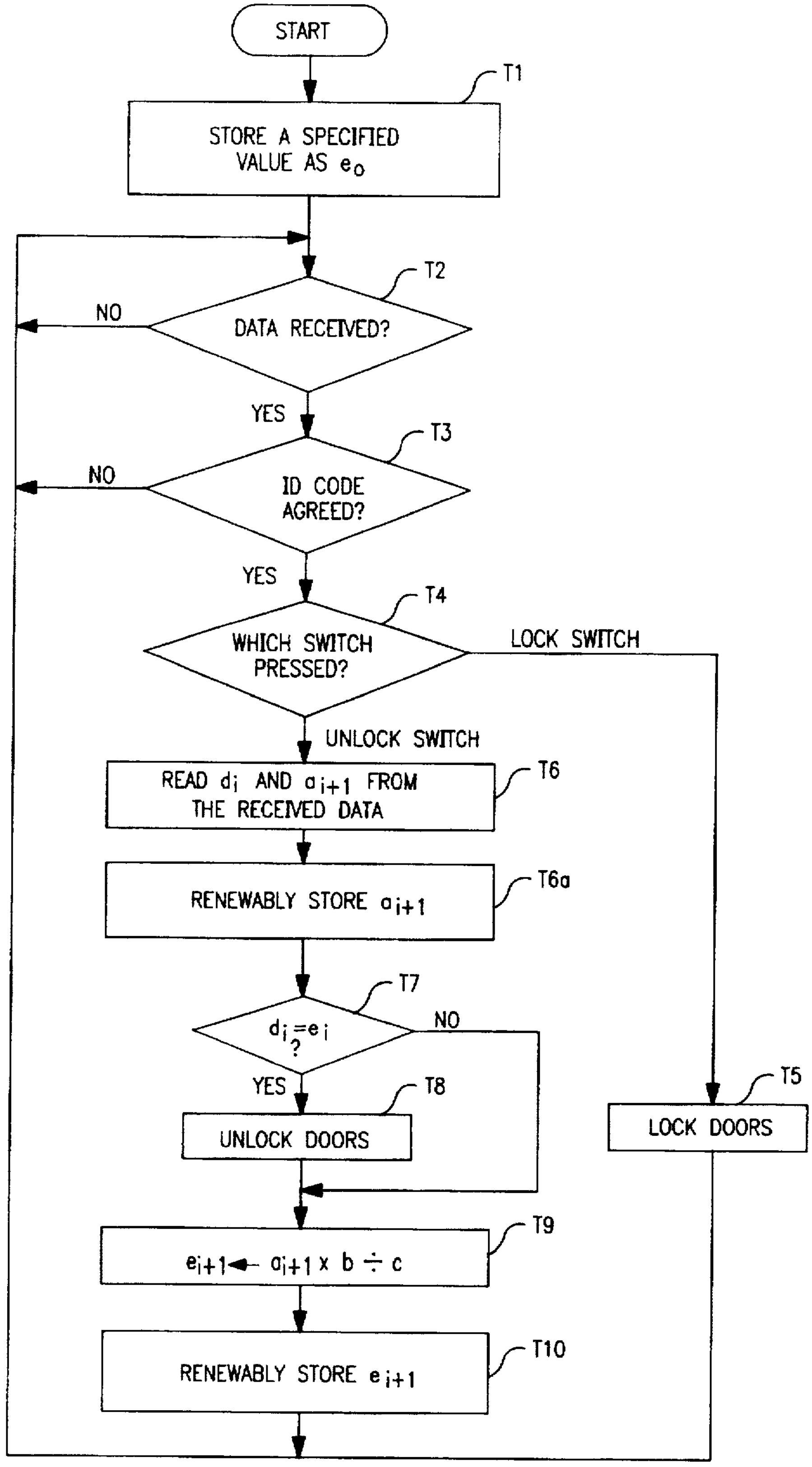
FIG. 5 is a flow chart showing the operation of a receiver according to one embodiment.

On the other hand, the operations as shown in FIG. 5 are performed, according to a preferred embodiment in the receiver 11, for example, upon replacement of a battery or a resetting operation. Specifically, a specified value is stored as an initial data $e_0$ of a calculation result e in the receiver-end storage 7 (Step T1). Then, it is discriminated whether the data from the transmitter 1 has been received (Step T2). If the discrimination result is in the negative, the discrimination of Step T2 is repeated until the data from the transmitter 1 is received. Upon receiving the data, it is discriminated whether the ID code in the received data agrees with a preset ID code (Step T3). If the discrimination result in T3 is in the negative, this routine returns to Step T2. If the discrimination result in T3 is in the affirmative, it is discriminated which of the lock switch 2 or the unlock switch 3 was pressed in the transmitter 1 in accordance with the unlock information or the lock information in the received data (Step T4).

If the lock switch 2 is discriminated to have been pressed in Step T4, the driver 17 drives the door lock motor 18 in accordance with the lock command signal from the receiver-end CPU 15 such that the doors are to be locked (Step T5), and this routine returns to Step T2. If the unlock switch 3 is discriminated to have been pressed in Step T4, the calculation result $d_i$ and the random number $a_{i+1}$ are read from the received unlock data (Step T6), wherein the random number $a_{i+1}$ is in particular renewably stored in a receiver-side random number memory (STEP T6a). Then, it is discriminated whether the calculation result d agrees with the calculation result e stored in the receiver-end storage 16 (Step T7).

If the discrimination result in Step T7 is in the affirmative, the driver drives the door lock motor in accordance with the unlock command signal from the receiver-end CPU 15 such that the doors are to be unlocked (Step T8). Thereafter, this routine proceeds to Step T9 as in the case where the discrimination result in Step T7 is in the negative. In Step T9, the receiver-end CPU 15 conducts a calculation in accordance with an operational expression or equation corresponding to the operational expression of the transmitter 1, in particular the operational expression stored in the transmitter-end ROM 5, (e.g. $a_{i+1}\times b+c+$constant, wherein the constant may preferably be set to be zero) of the program stored in the ROM 12 using the random number a read in Step T6 as a constant. This routine returns to Step T2 after the calculation result $e_{i+1}$ obtained by the receiver-end CPU 15 is renewably stored in the receiver-end storage or memory 16 (Step T10).

Accordingly, it is not necessary to provide transceivers at both transmitting and receiving ends as in the prior art. Even if the data is tapped, the doors cannot be unlocked unless the specified operational expression(s) is (are) known. This prevents the vehicle from getting stolen. Further, even if the transmission switch is operated out of the range of a radio wave, the doors can be unlocked by operating the transmission switch at least twice within the range of the radio wave. Therefore, the doors can be unlocked by a simple operation, and a simple construction prevents a vehicle theft.

Further, when the lock switch 2 provided in the portable transmitter 1 is operated, the lock data different from the unlock data is transmitted. Upon receipt of the lock data at the receiver end, the doors are locked. Accordingly, the doors can be locked and unlocked by means of a remote control and a vehicle theft can be effectively prevented.

Thus the data transmitted in one transmission step performed by the transmitter comprises the transmitter variable $d_i$ calculated in the preceding step or iteration and the random number $a_{i+1}$ generated in the present step, wherein on the receiver side the transmitted or received $d_i$ is compared with a receiver variable $e_i$ calculated in the preceding step and the received random number $a_{i+1}$ is stored and/or used to calculate a new receiver variable $e_{i+1}$, which will be compared in the next step with the transmitter variable $d_{i+1}$, which will be received in the next step.

Next, a series of control operations according to a second embodiment are described with reference to FIGS. 6 and 7.

Figure 6:
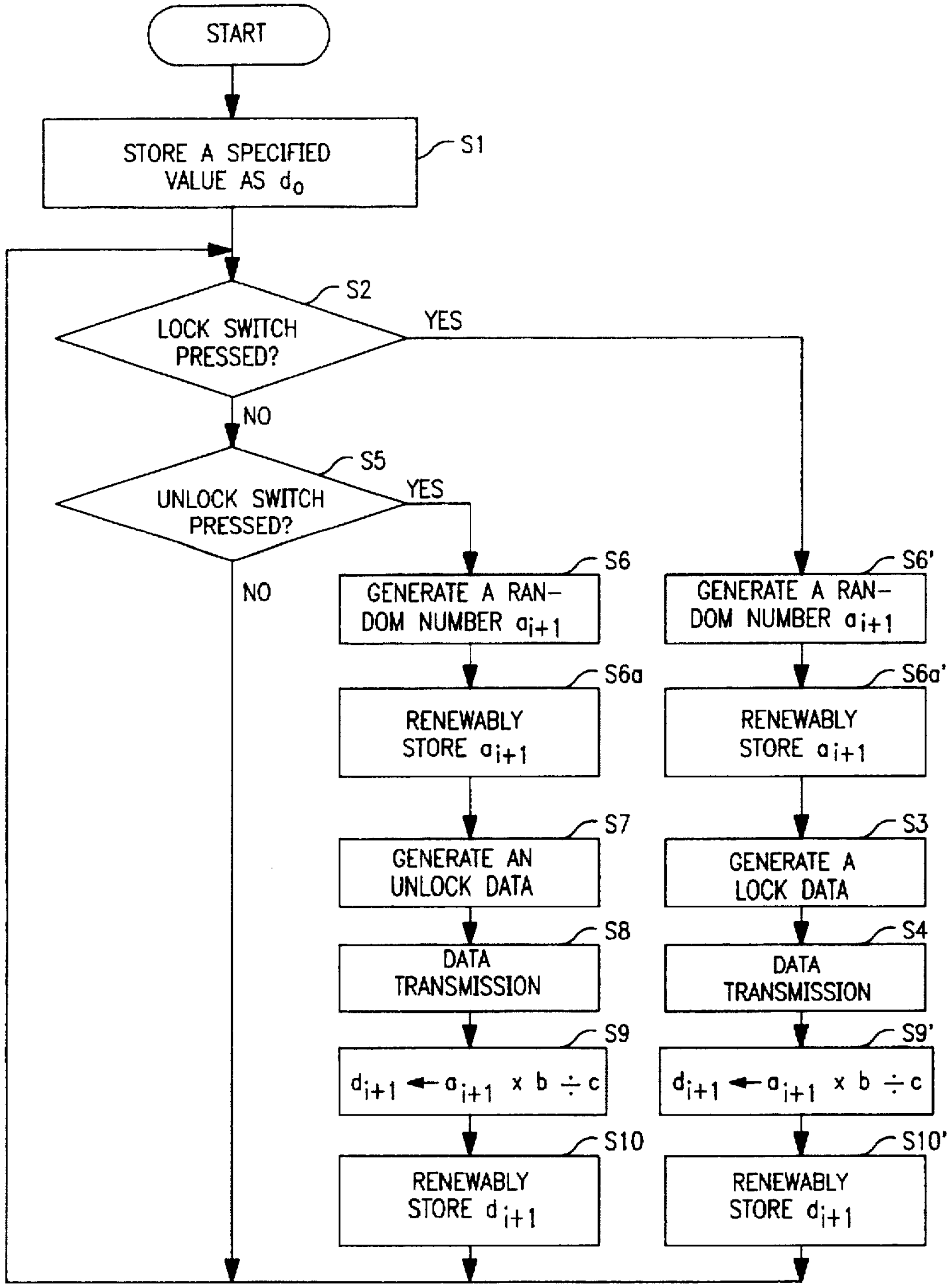
FIG. 6 is a flow chart showing the operation of a transmitter according to a further embodiment.

The operations as shown in FIG. 6 are performed according to a preferred embodiment in the transmitter 1, for example, upon replacement of a battery or a resetting operation. Specifically, a specified value $d_0$ is stored as an initial data of a calculation result d in the transmitter-end storage 7 (Step S1). Then, it is discriminated whether the lock switch 2 has been pressed (Step S2). If the discrimination result is in the affirmative, the random number generator 4 generates a random number $a_{i+1}$ (Step S6'); the generated random number $a_{i+1}$ is renewably stored in a transmitter-end random number memory (STEP 6a'), which may be additionally provided to the transmitter-end random number memory used in STEP 6a; the lock data as shown in FIG. 3 is generated (Step S3) and transmitted (Step S4). Thereafter, the transmitter-end CPU 6 conducts a calculation in accordance with the predetermined or predeterminable operational expression (e.g. $a_{i+1}\times b+c$, wherein $a_{i+1}$ is the random number and b,c are constants) of the program stored in the ROM 5 using the random number $a_{i+1}$ generated in Step S6' as a constant (Step S9'). The calculation result $d_{i+1}$ obtained by the transmitter-end CPU 6 is renewably stored in the transmitter-end storage 7 (Step S10').

The calculation result $d_i$ ($d_i=a_i\times b+c$ in the above example) in the lock data generated in Step S3 is a value before being renewed in Step S10'. Thereafter, this routine returns to Step S2, as in the first embodiment as described in reference to FIG. 4.

If the discrimination result in Step S2 is in the negative, it is discriminated whether the unlock switch 3 has been pressed (Step S5). If the discrimination result is in the negative, this routine returns to Step S2. If the discrimination result is in the affirmative, a sequence of steps corresponding to the sequence described in reference to FIG. 4 is performed or carried out. Once the transmitter-side system has been initialized, in particular during the normal usage, the flow diagram shown in FIG. 6 is iterated or repeated skipping the STEP S1 of storing a specified value $d_0$ as the calculation result d.

Figure 7:
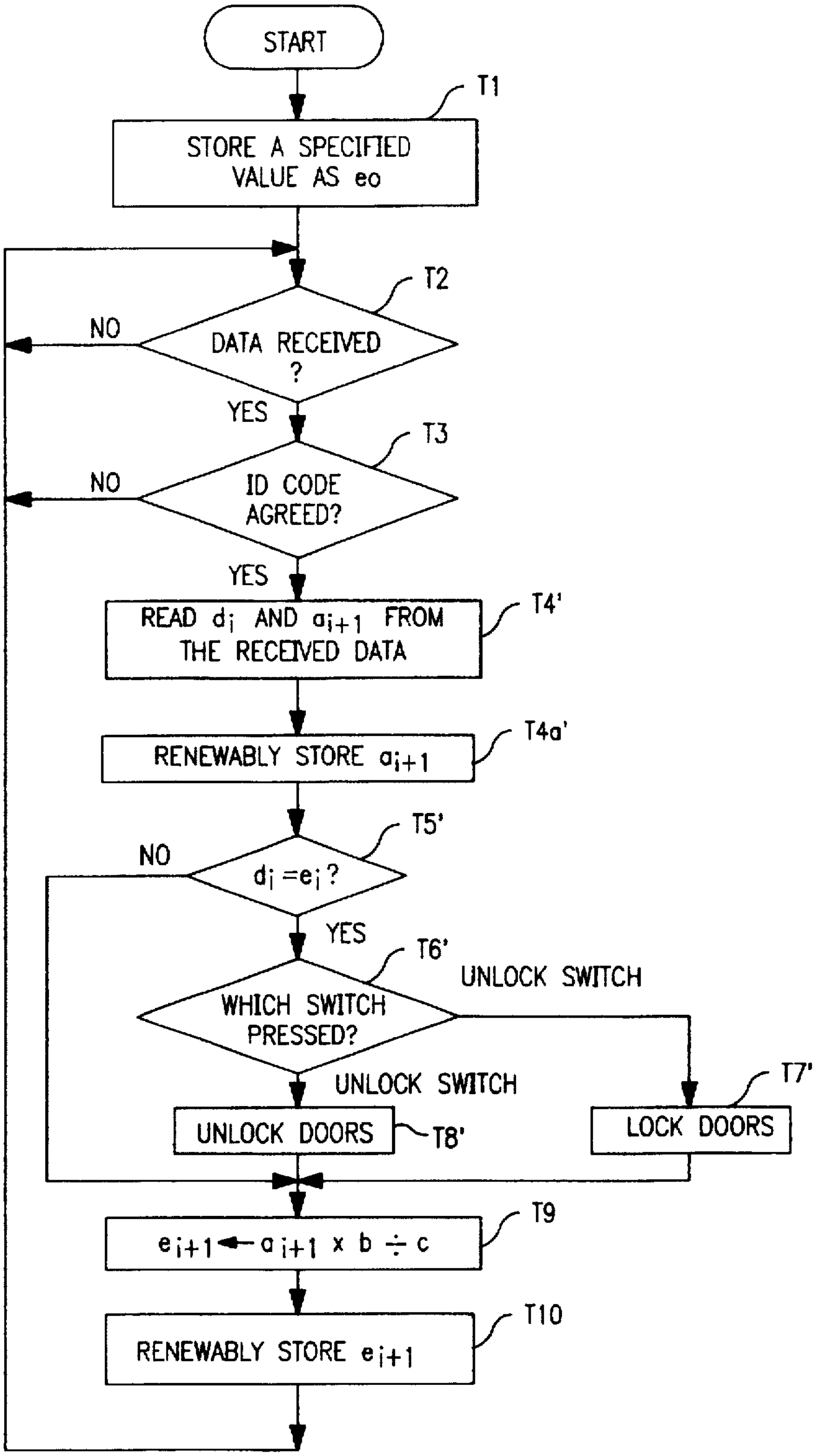
FIG. 7 is a flow chart showing the operation of a receiver according to still a further embodiment.

On the other hand, the operations as shown in FIG. 7 are performed, according to a further preferred embodiment in the receiver 11, for example, upon replacement of a battery or a resetting operation. Specifically, a specified value $e_0$ is stored as an initial data of a calculation result e in the receiver-end storage 7 (Step T1). Then, it is discriminated whether the data from the transmitter 1 has been received (Step T2). If the discrimination result is in the negative, the discrimination of Step T2 is repeated until the data from the transmitter 1 is received. Upon receiving the data, it is discriminated whether the ID code in the received data agrees with a preset ID code (Step T3). If the discrimination result in T3 is in the negative, this routine returns to Step T2.

If the discrimination result in T3 is in the affirmative, the calculation result $d_i$ and the random number $a_{i+1}$ are read from the received unlock data (Step T4'), wherein the read random number $a_{i+1}$ is preferably stored in a receiver-end random number memory (STEP 4a'). Then, it is discriminated whether the calculation result $d_i$ agrees with the calculation result $e_i$ stored in the receiver-end storage 16 (Step T5'). If the result $d_i$ agrees with the calculation result $e_i$ in Step T5', it is discriminated which of the lock switch 2 or the unlock switch 3 was pressed in the transmitter 1 in accordance with the unlock information or the lock information in the received data (Step T6').

If the lock switch 2 is discriminated to have been pressed in Step T6', receiver-end CPU 15 issues a command signal and the driver 17 in particular drives the door lock motor 18 in accordance with the lock command signal from the receiver-end CPU 15 such that the doors are to be locked (Step T7'). The routine then proceeds to Step T9.

If the unlock switch 3 is discriminated to have been pressed in Step T6', the receiver-end CPU 15 issues a further command and, in particular driver 17 drives the door lock motor in accordance with the unlock command signal from the receiver-end CPU 15 such that the doors are to be unlocked (Step T8').

After Step T7' and/or Step T8', this routine proceeds to Step T9. In Step T9, the receiver-end CPU 15 conducts a calculation in accordance with an operational expression or equation corresponding to the operational expression of the transmitter 1, in particular the operational expression stored in the transmitter-end ROM 5, (e.g. $a_{i+1}\times b+c+$constant, wherein the constant may preferably be set to be zero) of the program stored in the ROM 12 using the random number $a_{i+1}$ read in Step T6 as a constant. This routine returns to Step T2 after the calculation result $e_{i+1}$ obtained by the receiver-end CPU 15 is renewably stored in the receiver-end storage or memory 16 (Step T10).

Accordingly, also in this embodiment it is not necessary to provide transceivers at both transmitting and receiving ends as in the prior art. Even if the data is tapped, the doors cannot be unlocked unless the specified operational expression(s) is (are) known. This prevents the vehicle from getting stolen. Further, even if the transmission switch is operated out of the range of a radio wave, the doors can be unlocked by operating the transmission switch at least twice within the range of the radio wave. Therefore, the doors can be unlocked by a simple operation, and a simple construction prevents a vehicle theft.

Further, when the lock switch 2 provided in the portable transmitter 1 is operated, also in this embodiment the lock data different from the unlock data is transmitted. Upon receipt of the lock data at the receiver end, the doors are locked. Accordingly, the doors can be locked and unlocked by means of a remote control and a vehicle theft can be effectively prevented.

LIST OF REFERENCE NUMERALS

| | |
|---|---|
| 1 | Portable Transmitter |
| 2 | Lock Switch |
| 3 | Unlock Switch |
| 4 | Random Number Generator |
| 6 | Transmitter-End CPU |
| 7 | Transmitter-End Storage |
| 8 | Transmitting Unit |
| 11 | Receiver |
| 14 | Receiving Unit |
| 15 | Receiver-End CPU |
| 16 | Receiver-End Storage |
| 17 | Driver |
| 18 | Door Lock Motor |

What is claimed is:

1. A security system for an automotive vehicle, which comprises a transmitter (1) and a receiver (11) that cooperate to produce a control signal for actuating a security device, and wherein the transmitter (1) comprises:

a number generator (4) for sequentially generating numbers $a_i$, $a_{i+1}$, a transmitter-end calculation unit (6) for sequentially calculating transmitter variables $d_i$, $d_{i+1}$, based on a predetermined operational expression using the respective numbers $a_i$, $a_{i+1}$, as a constant, and a transmitting unit (8,9) for sequentially transmitting data to the receiver (11), wherein the data comprises a transmitter variable code obtained by encoding the transmitter variable $d_i$ and a constant code obtained by encoding the next generated number $a_{i+1}$, and wherein the receiver (11) comprises:

a receiving unit (14, 13) for receiving the data from the transmitter (1), a receiver-end calculation unit (15) for sequentially calculating receiver variables $e_i$, $e_{i+1}$, based on the predetermined operational expression, using, respectively the sequentially received numbers $a_i$, $a_{i+1}$, represented by the constant code in the data received from the transmitter (1), and a controller means (15) for comparing the calculated receiver variable $e_i$ with the transmitter variable $d_i$ represented by the transmitter variable code in the received data, and for outputting a control signal, in response to an affirmative comparison, for actuating the security device.

2. A security system according to claim 1, further comprising a transmitter-end storage means (7) for renewably storing the transmitter variable $d_{i+1}$ after its calculation by the transmitter-end calculation unit (6) and a receiver-end storage means (16) for renewably storing the receiver variable $e_{i+1}$ after its calculation by the receiver-end calculation unit (15).

3. A security system according to claim 2, wherein the transmitter further comprises a means for generating a specific identification code individually allocated to said transmitter (1), said transmitted data comprising said identification code.

4. A security system according to claim 3, wherein the receiver (11) comprises a discrimination unit (15) for discriminating whether the identification code in the received data agrees with a code individually allocated to said receiver (11).

5. A security system according to claim 1, wherein the transmitted data comprise a control code defining parity bits for controlling the correct transmission of the data.

6. A security system according to claim 1, wherein:

the transmitter (1) further comprises a data transmission switch for causing the transmitting unit (8, 9) to transmit the data.

7. A security system according to claim 1, wherein said security device comprises a lock and the transmitted data comprises one of lock information and unlock information and wherein said control signal output by the controller means (15) functions as one of a lock command signal and an unlock command signal.

8. A security system according to claim 1, wherein the number generator is a random number generator for sequentially generating random numbers.

9. A security system according to claim 1, wherein the transmitting unit (8, 9) is operative for sequentially transmitting:

a transmitter variable code based on the transmitter variable $d_i$ calculated following the preceding transmission and using the number $a_i$ generated in the preceding number generation; and a constant code based on the number $a_{i+1}$ generated in the present number generation.

10. A method for secure access to an automotive vehicle, using a control signal for actuating a security device, comprising the steps of:

sequentially generating numbers $a_i$, $a_{i+1}$, $a_{i+2}$, . . . $a_{i+n}$, at a location remote from the vehicle;

sequentially calculating transmitter variables $d_i$, $d_{i+1}$, $d_{i+2}$, . . . $d_{i+n}$, at the remote location based on a predetermined operational expression using the respective number $a_i$, $a_{i+1}$, $a_{i+2}$, . . . $a_{i+n}$, as a constant in each respective calculation;

coding one said transmitter variable $d_i$ and the next generated number $a_{i+1}$ as data at the remote location;

transmitting the data from the remote location;

receiving the data at the vehicle;

calculating, at the vehicle, a receiver variable $e_i$ using the predetermined operational expression with the number $a_i$ received in a previous transmission of data from the remote location;

comparing the receiver variable $e_i$ calculated at the vehicle with the transmitter variable $d_i$ transmitted from the remote location; and outputting a control signal in the vehicle based on the step of comparing the receiver variable $e_i$ with the transmitter variable $d_i$ producing an affirmative result, and using said control signal to actuate said security device.

11. The method of claim 10, wherein the step of sequentially generating numbers comprises sequentially generating random numbers.

12. The method of claim 10, further comprising the step of temporarily storing the transmitter variable at the remote location after the step of calculating the transmitter variable.

13. The method of claim 12, further comprising the step of deleting the previous stored transmitter variable each time a new transmitter variable is calculated and stored.

14. The method of claim 10, further comprising the step of temporarily storing the receiver variable at the vehicle after the step of calculating the receiver variable.

15. The method of claim 14, further comprising the step of deleting the previously stored receiver variable when each new receiver variable is calculated and stored.

16. The method of claim 10, wherein the step of transmitting the data from the remote location further comprises transmitting, from the remote location, a previously assigned identification code, the step of receiving the data at the vehicle further comprises receiving the identification code, and wherein the step of comparing comprises comparing the received identification code with a stored identification code in the vehicle.

17. The method of claim 16, wherein the step of transmitting comprises transmitting a selected one of a lock signal and an unlock signal.

* * * * *